(12) United States Patent
Kim et al.

(10) Patent No.: US 12,312,020 B2
(45) Date of Patent: May 27, 2025

(54) ACTIVE HIDDEN AIR CURTAIN AND VEHICLE HAVING THE SAME

(71) Applicants: HYUNDAI MOTOR COMPANY, Seoul (KR); KIA CORPORATION, Seoul (KR)

(72) Inventors: Tae-Hyung Kim, Incheon (KR); Hak-Lim Kim, Yongin-si (KR); Sang-Bong Lee, Hwaseong-si (KR); Sung-Uk Choi, Hwaseong-si (KR); Ji-Won Seo, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 389 days.

(21) Appl. No.: 17/843,510

(22) Filed: Jun. 17, 2022

(65) Prior Publication Data
US 2023/0073908 A1    Mar. 9, 2023

(30) Foreign Application Priority Data
Sep. 6, 2021    (KR) .................... 10-2021-0118351

(51) Int. Cl.
*B62D 35/00*    (2006.01)
*B60Q 1/26*    (2006.01)
*B60R 19/48*    (2006.01)

(52) U.S. Cl.
CPC .......... *B62D 35/00* (2013.01); *B60Q 1/2661* (2013.01); *B60R 19/48* (2013.01); *B60R 2019/486* (2013.01)

(58) Field of Classification Search
CPC ...... B62D 35/00; B62D 35/005; B62D 37/02; B62D 35/02; B62D 35/008; B62D 25/12;
(Continued)

(56) References Cited

U.S. PATENT DOCUMENTS

| | | | |
|---|---|---|---|
| 4,460,213 A * | 7/1984 | Janssen ................ | B62D 35/005 296/180.5 |
| 7,766,111 B2 * | 8/2010 | Guilfoyle ............. | B60K 11/085 296/180.5 |

(Continued)

FOREIGN PATENT DOCUMENTS

| KR | 100694918 B1 | 3/2007 |
|---|---|---|
| KR | 20100064996 A | 6/2010 |

*Primary Examiner* — Amy R Weisberg
*Assistant Examiner* — Whitney Nicole Francis
(74) *Attorney, Agent, or Firm* — Lempia Summerfield Katz LLC

(57) ABSTRACT

A speed sensitive type active hidden air curtain of a vehicle includes: hole opening or closing devices configured to cover or open an air hole of a bumper facing traveling wind with any one of a bumper interlocking device, a lamp interlocking device, and a hole color change device to guide air to a space formed between a bumper and a wheel; a power connection member interlocked with a deflector guiding the traveling wind under the bumper to move the hole opening or closing devices; and a supporter maintaining tension of the power connection member. The speed type active hidden air curtain thereby implements a clean and differentiated design image of the bumper and improves appearance quality thereof by covering the air hole exposed to the outside.

18 Claims, 7 Drawing Sheets

(58) Field of Classification Search
CPC .... B62D 25/08; B60Q 1/2661; B60Q 1/0017; B60Q 1/05; B60Q 1/2692; B60Q 1/0035; B60Q 1/0408; B60Q 1/326; B60R 19/48; B60R 2019/486; B60R 2019/1886; B60R 19/023; B60R 2019/527; Y02T 10/82; Y02T 10/88; B60K 11/085; B60K 11/08; F21S 45/47; F03D 9/32; Y10S 180/903
USPC ... 296/181.5, 180.1, 180.5, 198, 208, 181.1; 180/903, 89.1; 454/75, 141, 145, 164, 454/239

See application file for complete search history.

(56) References Cited

U.S. PATENT DOCUMENTS

| | | | | |
|---|---|---|---|---|
| 8,631,889 B2* | 1/2014 | Begleiter | ............ | B60T 5/00 180/68.1 |
| 8,708,075 B2* | 4/2014 | Maurer | ............ | B60K 11/08 180/68.1 |
| 8,794,363 B2* | 8/2014 | Wolf | ............ | B60K 11/085 180/68.1 |
| 8,892,314 B2* | 11/2014 | Charnesky | ............ | F01P 7/04 180/68.1 |
| 9,150,261 B2 | 10/2015 | Deangelis | | |
| 9,216,644 B2* | 12/2015 | Cardile | ............ | B60K 11/085 |
| 9,487,251 B2* | 11/2016 | Gibson | ............ | F16D 65/847 |
| 9,637,180 B2* | 5/2017 | Wolf | ............ | B60K 11/04 |
| 9,694,858 B2* | 7/2017 | Wolf | ............ | B62D 37/02 |
| 9,738,152 B2* | 8/2017 | Yoon | ............ | B62D 35/005 |
| 10,160,308 B2* | 12/2018 | Chae | ............ | B60T 5/00 |
| 10,344,663 B2* | 7/2019 | Nam | ............ | B60H 1/3211 |
| 10,625,596 B2* | 4/2020 | Laurent | ............ | B60K 11/085 |
| 10,647,194 B1* | 5/2020 | Burtch | ............ | B60K 11/085 |
| 10,668,958 B2* | 6/2020 | Seitz | ............ | B62D 35/005 |
| 10,807,655 B2 | 10/2020 | Wolf | | |
| 11,203,258 B2* | 12/2021 | Kim | ............ | B62D 25/20 |
| 11,807,311 B2* | 11/2023 | Harter | ............ | B62D 37/02 |
| 2012/0071075 A1* | 3/2012 | Wolf | ............ | B60T 5/00 454/162 |
| 2013/0248141 A1* | 9/2013 | Maurer | ............ | B60K 11/08 165/44 |
| 2016/0272257 A1* | 9/2016 | McKillen | ............ | B62D 35/02 |
| 2016/0272258 A1* | 9/2016 | Gibson | ............ | B62D 37/02 |
| 2017/0082092 A1* | 3/2017 | Gaither | ............ | F16D 65/847 |
| 2017/0144533 A1* | 5/2017 | Gilotte | ............ | B62D 25/085 |
| 2018/0051859 A1* | 2/2018 | Scervo | ............ | B60K 13/02 |
| 2018/0148108 A1* | 5/2018 | Del Gaizo | ............ | B62D 35/008 |
| 2020/0108684 A1* | 4/2020 | Parry-Williams | ........ | B60G 3/20 |
| 2020/0156715 A1 | 5/2020 | Andre et al. | | |
| 2021/0323397 A1* | 10/2021 | Iorga | ............ | B60K 11/085 |
| 2022/0033014 A1* | 2/2022 | Watanabe | ............ | B62D 35/02 |

* cited by examiner

<A INNER PERSPECTIVE DIAGRAM>

FIG.7
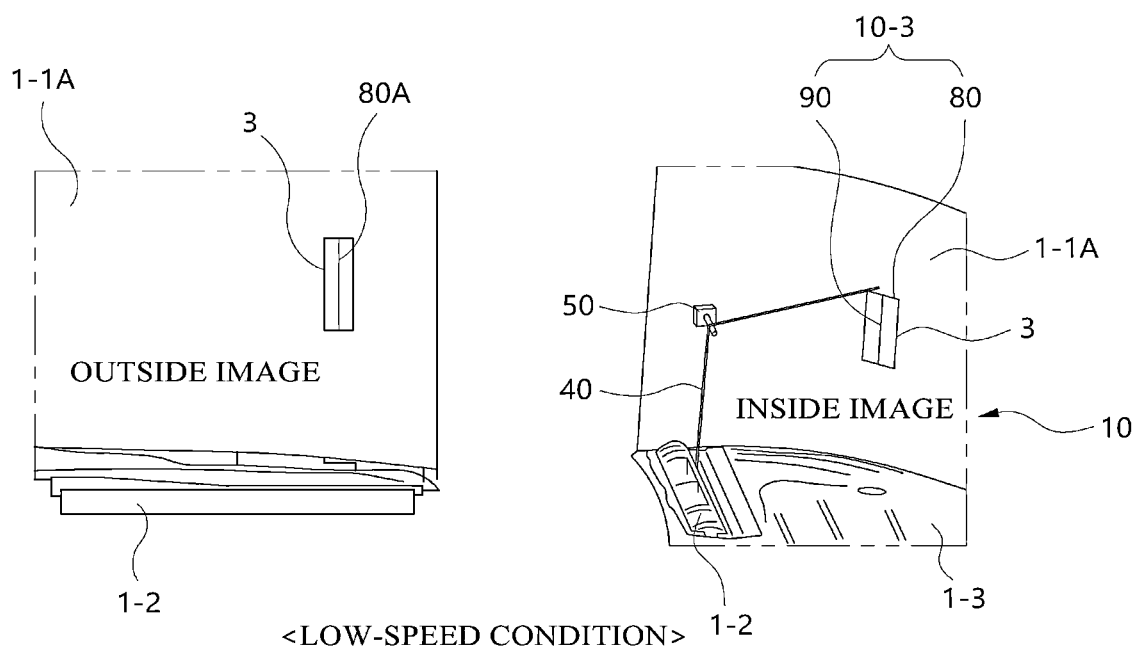
<LOW-SPEED CONDITION>
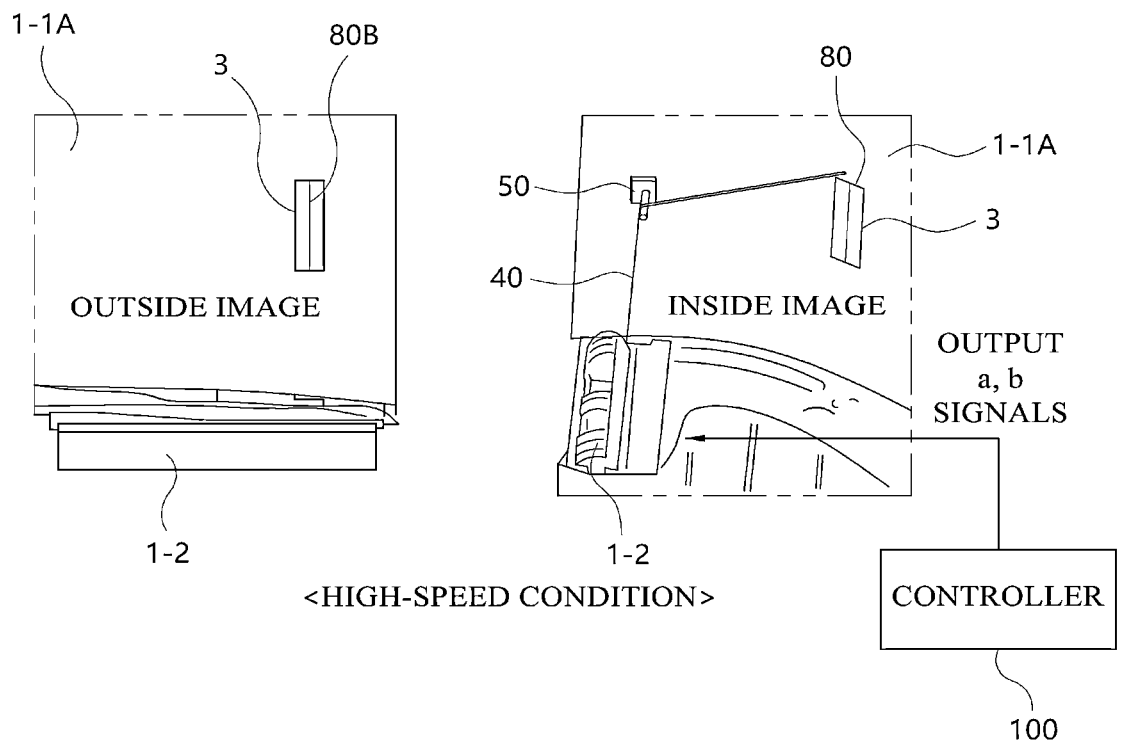
<HIGH-SPEED CONDITION>

ACTIVE HIDDEN AIR CURTAIN AND VEHICLE HAVING THE SAME

CROSS-REFERENCE TO RELATED APPLICATION

This application claims priority to and the benefit of Korean Patent Application No. 10-2021-0118351, filed on Sep. 6, 2021, which is incorporated herein by reference in its entirety.

BACKGROUND

Field of the Disclosure

The present disclosure relates to a hidden air curtain, and particularly, to a vehicle having a speed sensitive type active hidden air curtain, which can interlock different similar devices with each other, each of which improve an aerodynamic property according to a traveling speed of a vehicle, thereby resolving design restrictions of the vehicle as well as implementing the synergy effect of the aerodynamic improvement even while each independent operation is performed.

Description of Related Art

Generally, it is possible to enhance performance of a vehicle by improving the aerodynamic property according to an increase in a vehicle speed while the vehicle travels.

Two examples of a device for controlling the aerodynamic property of the vehicle include a deflector and an air curtain.

In one example, the deflector is a road clearance variable device and is composed of an actuator and a flap. The deflector may be exposed from a front bumper to the bottom of the vehicle depending upon the vehicle speed to introduce traveling wind (i.e., wind created by the speed of the vehicle while the vehicle travels, in other words wind created by movement of the vehicle traveling in a direction) into an engine room side or block the traveling wind, thereby improving a vehicle drag.

Further, the air curtain is a wheel resistance reduction device and is composed of an air duct and a cover that extend from a side surface of a front bumper toward a wheel fender. The air curtain covers or opens an opening hole of the front bumper using the cover depending upon the vehicle speed to introduce the traveling wind on the side surface of the vehicle into a passage of the air curtain, thereby improving the vehicle drag with a change in a wheel resistance airflow going through the side surface of the vehicle.

As described above, the deflector and the air curtain can change the airflow of the traveling wind flowing along the shape of the vehicle from the front and side surfaces of the vehicle, thereby improving the aerodynamic property against the vehicle drag generated under a vehicle body and on wheel/tire portions of the vehicle.

However, the deflector and the air curtain are devices for improving the aerodynamic performance, and the configurations thereof are separately formed and the operations thereof are independently performed. Therefore, it is difficult to secure a space in which a system is mounted, and in particular, a component connected to the system, such as a controller, is also overlapped to inevitably complicate the system.

Therefore, even if the air curtain implements the similar function and operation that reduces the wheel resistance when the vehicle travels at high speed, like the existing road clearance variable type device, the air curtain has no component connecting these road clearance variable type devices, thereby not implementing the synergy effect with the devices having the similar function and property.

Furthermore, air curtains typically have a uniform air curtain design structure in all vehicles, and therefore, have a uniform design shape that is an outside exposure type opening hole shape and also have the limitation that there is no design differentiation by vehicle type.

The contents described in Description of Related Art are to help the understanding of the background of the present disclosure, and may include what is not previously known to those having ordinary skill in the art to which the present disclosure pertains.

SUMMARY

Therefore, an object of the present disclosure considering the above point is to provide a speed sensitive type hidden air curtain and a vehicle having the same, which can operate a deflector and an air curtain that improve the aerodynamic property according to a traveling speed of a vehicle in conjunction with each other to implement a synergy effect, thereby largely enhancing performance of the improvement in a vehicle drag. In particular, the disclosed speed sensitive type hidden air curtain can close an opening hole of a bumper while the vehicle stops with the variable movement by the power of the deflector through the air curtain to implement an externally clean and differentiated design image for each vehicle type, thereby improving appearance quality. The disclosed speed sensitive type hidden air curtain can also open the opening hole of the bumper while the vehicle travels, thereby maintaining the aerodynamic effect of the air curtain as it is.

A hidden air curtain according to the present disclosure for achieving the above objects includes a hole opening or closing device configured to cover or open an air hole of a bumper facing traveling wind such that air is guided to a side portion of a tire in a space between the bumper and a wheel. The hidden air curtain according to the present disclosure also includes a power connection member interlocked with the movement of the hole opening or closing device, and connected to a vehicle traveling aerodynamic improvement device, or simply vehicle aerodynamic improvement device, to which the traveling wind is guided under the bumper. The hidden air curtain according to the present disclosure may also include a supporter maintaining the tension of the power connection member.

In an embodiment, the vehicle aerodynamic improvement device is a deflector, and the hole opening or closing device is composed of any one of a bumper interlocking device, a lamp interlocking device, or a hole color change device.

In an embodiment, the bumper interlocking device is composed of: an air duct located inside the bumper and fixed to the bumper, and formed with (i.e., including) an air passage extending from the air hole toward the wheel along the bumper; a curtain box movable from the air duct by a pulling of the power connection member, such that the air hole opens by the movement of the curtain box; and the vehicle aerodynamic improvement device for the pulling of the power connection member.

In an embodiment, the curtain box is fitted into a duct slit of the air duct, and the curtain box maintains an assembled state by the duct slit and the movement thereof is guided by the duct slit.

In an embodiment, the curtain box is provided with a curtain door in which the air hole is covered, and the same color as a color of an externally exposed surface of the bumper is applied to an externally exposed surface of the curtain door.

In an embodiment, the curtain box is provided with a duct spring compressed by the movement of the curtain box, and the duct spring generates a spring reaction force such that the curtain box covers the air hole when the pulling of the power connection member is released.

In an embodiment, the duct spring is located between the air duct and the curtain box, and one end of the duct spring is constrained to the air duct such that compression occurs.

In an embodiment, the bumper interlocking device is composed of: an air duct located inside the bumper, and formed with an air passage extending from the air hole toward the wheel along the bumper; a curtain box movable from the air duct by a pulling of the power connection member, such that the air hole opens by the movement of the curtain box; and an air curtain driving machine for the moving of the curtain box, and for moving the power connection member.

In an embodiment, the air curtain driving machine operates the vehicle aerodynamic improvement device by the movement of the power connection member.

In an embodiment, the lamp interlocking device is composed of: a curtain box fixed to a lamp housing of a lamp provided on the bumper, and moving the lamp by a movement caused by a pulling of the power connection member; a lamp entry provided on the bumper, and having a lamp hole exposing a part of the lamp to the outside perforated therein (i.e., the lamp hole is perforated in the bumper, thereby exposing a part of the lamp to the outside); and the vehicle aerodynamic improvement device for the pulling of the power connection member.

In an embodiment, the hole color change device is composed of a different color door covering the air hole, and rotated by a pulling of the power connection member to vary an externally exposed color of the air hole, and the vehicle aerodynamic improvement device for the pulling of the power connection member.

In an embodiment, the different color door is connected to the power connection member with a door rotary shaft provided on a door body, and the door body has both surfaces painted in different colors or formed in different images.

In an embodiment, the power connection member is formed of (i.e., comprises) any one of a strap, a wire, a cable, and a belt.

In an embodiment, the supporter is provided with a rotary shaft to which the power connection member is latched, and the rotary shaft makes the power connection member, to which the hole opening or closing device and the vehicle aerodynamic improvement device are connected, at the right angle to move the power connection member in contact with the rotary shaft.

Further, a vehicle according to the present disclosure for achieving the object includes: a bumper; a deflector deployed under the bumper depending upon a change in a vehicle speed, and guiding traveling wind; a hidden air curtain interlocked with any one of a bumper interlocking device, a lamp interlocking device, and a hole color change device by a movement of a power connection member connected to the deflector in a state where tension is maintained by a supporter to face the traveling wind on a side portion of the bumper; and a controller configured to operate the deflector or the hidden air curtain depending upon a change in the vehicle speed.

In an embodiment, the bumper interlocking device is configured to allow power generated by an actuator of the deflector to be delivered to the power connection member to open or close an air hole perforated in the bumper, or to allow power generated by an air curtain driving machine of the hidden air curtain to be delivered through the power connection member to the deflector while opening or closing the air hole.

In an embodiment, the lamp interlocking device is configured to allow power generated by an actuator of the deflector to be delivered to the power connection member to open or close a lamp hole of a lamp entry provided on the bumper.

In an embodiment, the hole color change device is configured to allow power generated by an actuator of the deflector to be delivered to the power connection member to cover an air hole perforated in the bumper in different colors.

The speed sensitive type active hidden air curtain applied to the vehicle according to the present disclosure implements the following operations and effects.

First, it is possible to implement the system efficiency of the road clearance variable type device that interlocks two different devices that improve the aerodynamic property according to the traveling speed of the vehicle, thereby implementing the similar function and operation that reduce the wheel resistance when the vehicle travels at high speed. Second, it is possible to implement the hidden air curtain in conjunction with the deflector and the air curtain, thereby resolving the design uniformity using the same air curtain for each vehicle type and resolving restrictions for the vehicle design. Third, it is possible to implement the performance control of the multiple aerodynamic components with the same property using one driving source, such as coupling the driving unit of the hidden air curtain and the driving unit of the speed sensitive type variable deflector. Fourth, it is possible to move the location of the driving unit of the speed sensitive type variable deflector from the lowermost end of the vehicle body to the upper end of the air curtain side in connection with the hidden air curtain, thereby implementing the control to become robust in terms of quality.

Further, the vehicle in which the speed sensitive type active hidden air curtain according to the present disclosure is mounted implements the following operations and effects.

First, the hidden air curtain can be variably operated as the speed sensitive type, thereby differentiating the vehicle appearance with the low speed/high speed variable images on the side surface portion of the front bumper. Second, it is possible to apply the design capable of simultaneously satisfying two conditions when the design region of the air curtain conflicts with the fog lamp or the turn signal lamp disposed on the lower end of the side surface of the front bumper. Third, it is possible to apply the form of the hidden air curtain having the degree of freedom of design as in the driving method connected to the deflector except for the point in which the energy usability is low even if the hidden air curtain is operated using the motor, the electromagnet, the hydraulic pressure, and the like as the separate driving source.

BRIEF DESCRIPTION OF THE DRAWINGS

FIG. 7 is a diagram showing an example in which the speed sensitive type active hidden air curtain according to the present disclosure is changed to a vehicle traveling display device, and therefore, the color is changed according to a traveling speed of the vehicle through an air hole of the bumper.

DESCRIPTION OF SPECIFIC EMBODIMENTS

Hereinafter, an embodiment of the present disclosure is described in detail with reference to the accompanying drawings, and this embodiment is one example and can be implemented by those having ordinary skill in the art to which the present disclosure pertains in various different forms, and therefore, is not limited to the embodiment described herein.

When a component, device, element, or the like of the present disclosure is described as having a purpose or performing an operation, function, or the like, the component, device, or element should be considered herein as being "configured to" meet that purpose or to perform that operation or function.

Figure 1:
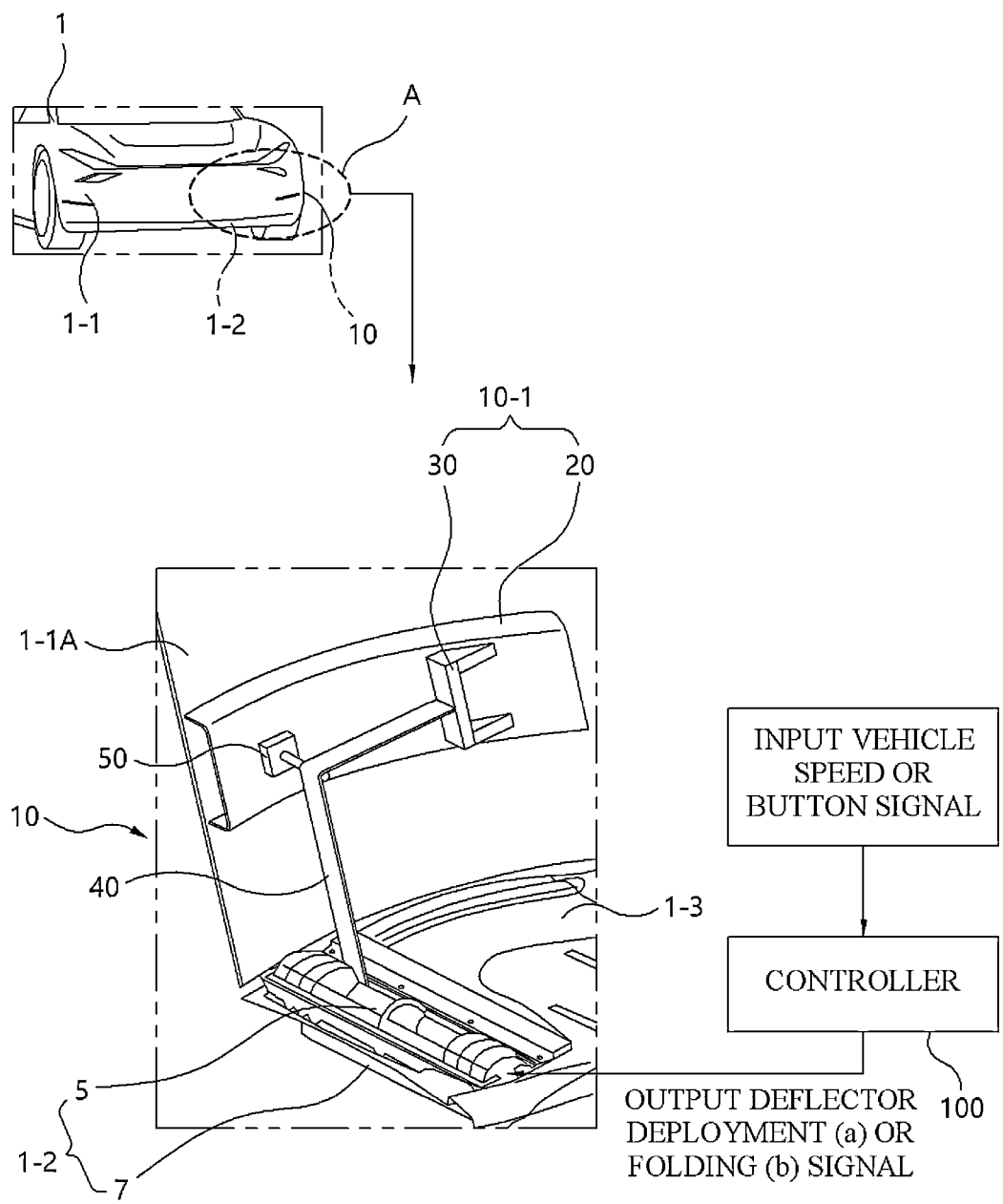
FIG. 1 is a configuration diagram of a speed sensitive type active hidden air curtain applied to a vehicle according to the present disclosure.
Figure 2:
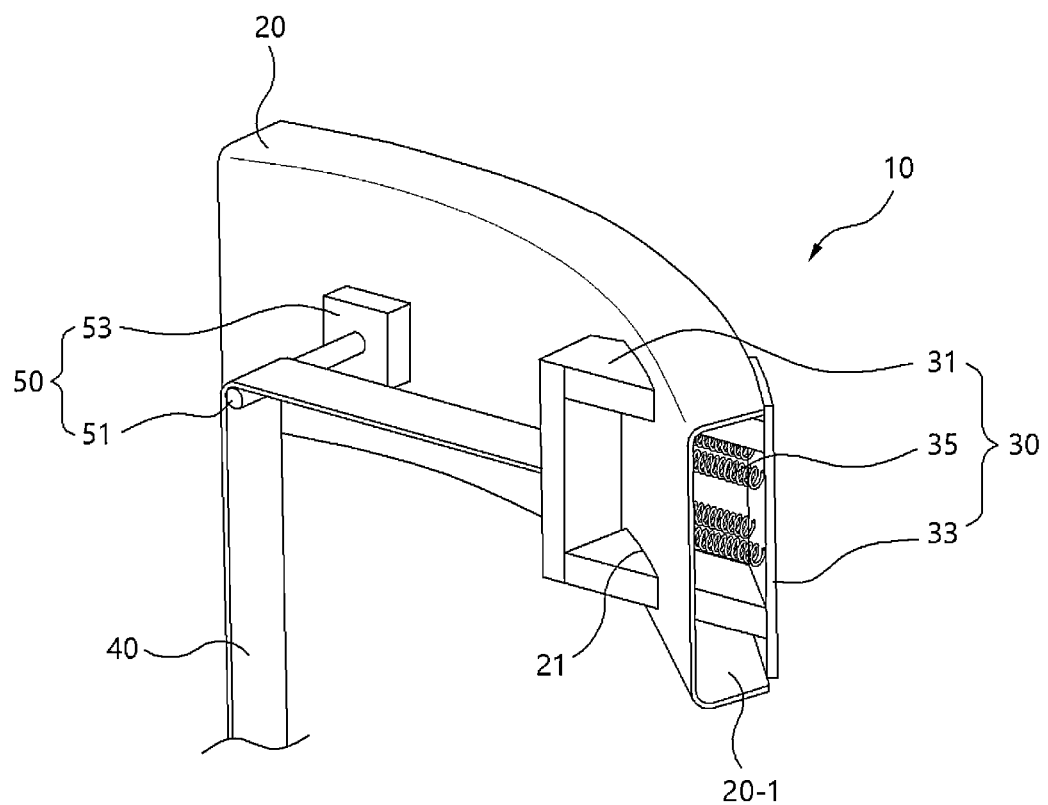
FIG. 2 is a detailed configuration diagram of the speed sensitive type active hidden air curtain according to the present disclosure.

FIGS. 1 and 2 show a detailed configuration of a hidden air curtain 10. As shown, a vehicle 1 includes the hidden air curtain 10 operated in connection with a vehicle aerodynamic improvement device (e.g., a deflector 1-2).

In particular, the hidden air curtain 10 is characterized by a speed sensitive type active hidden air curtain that opens or blocks an air hole 3 of a bumper 1-1 using hole opening or closing devices 10-1, 10-2, 10-3 operated with the deflector 1-2 that is operated in conjunction with a vehicle speed.

Hereinafter, it is described that the hole opening or closing devices 10-1, 10-2, 10-3 are composed of any one of a bumper interlocking device 10-1 (see FIGS. 1 to 5), a lamp interlocking device 10-2 (see FIG. 6), and a hole color change device 10-3 (see FIG. 7), and the hidden air curtain 10 has the bumper interlocking device 10-1 (see FIGS. 1 to 5) as a basic component and is applied to the vehicle 1.

Referring to FIG. 1, the hidden air curtain 10 is composed of the bumper interlocking device 10-1, a power connection member 40, a supporter 50, and a controller 100.

Specifically, the bumper interlocking device 10-1 is matched with the bumper 1-1 to cover the air hole 3 of the bumper 1-1 when the vehicle 1 travels at low speed whereas the bumper interlocking device 10-1 moves backward (i.e., into an inner space of a bumper skin 1-1A of the bumper 1-1) when the vehicle travels at high speed to open the air hole 3, such that a path through which traveling wind goes is formed.

To this end, the bumper interlocking device 10-1 is composed of an air duct 20 and a curtain box 30.

For example, the air duct 20 is added to the bumper skin 1-1A of the bumper 1-1 and located in the inner space of the bumper skin 1-1A. The air duct 20 discharges outside air (i.e., traveling wind) introduced into the air hole 3 from the front of the bumper toward a wheel to reduce an air resistance applied to the wheel by a turbulent flow formed behind the bumper 1-1. In this case, the air duct 20 is attached or coupled to the bumper 1-1 or the bumper skin 1-1A to maintain the fixed state against the movement of the curtain box 30.

Further, the curtain box 30 is coupled to one side portion of the air duct 20, and enters an air passage 20-1 of the air duct 20 (see FIG. 2) to open the air hole 3 to communicate the path of the air passage 20-1 to the wheel side, or exits from the air passage 20-1 to block the air hole 3, such that the outside air (i.e., traveling wind) goes to the outside of the bumper 1-1.

Specifically, the power connection member 40 provides the power that moves the bumper interlocking device 10-1, and the supporter 50 maintains the tension of the power connection member 40.

For example, the power connection member 40 is formed or comprised of any one of a strap, a wire, a cable, and a belt, and has the other end fixed to the curtain box 30 with one end fixed to an actuator 5 of the deflector 1-2. Further, the supporter 50 latches an intermediate portion of the power connection member 40, and is fixed to the air duct 20 at a location spaced apart from the curtain box 30 such that the power connection member 40 can maintain the tension.

Therefore, the power connection member 40 is pulled or wound by a driving force of the actuator 5 upon operation of the deflector 1-2, and pulls the curtain box 30 by the movement amount thereof, such that the air hole 3 is opened.

For example, the deflector 1-2 is a speed sensitive type variable deflector in which a road clearance variable type technology is implemented, and performs the aerodynamic improvement of the vehicle 1, including the actuator 5 and a flap 7. Therefore, as the flap 7 exits from an undercover 1-3 (or vehicle body panel) constituting the bottom of the vehicle body in a bottom direction of the vehicle (i.e., road direction) by the driving of the actuator 5, the deflector 1-2 induces the flow of the traveling wind going through the bottom of the vehicle, thereby improving the aerodynamic of the vehicle.

In particular, the actuator 5 is provided with a winding mechanism, such as a pulley, on a rotary shaft, and therefore, the curtain box 30 can be pulled by the power connection member 40 wound around the winding mechanism upon rotation of the rotary shaft.

Specifically, the controller 100 confirms the vehicle speed of the vehicle 1 or a button signal of a deflector button provided on a cluster of the vehicle 1 as an input signal, and drives the actuator 5 of the deflector 1-2 with the output of a deflector deployment signal (a) or folding signal (b).

Therefore, the controller 100 drives the deflector 1-2 and the hidden air curtain 10 together, and therefore, a deflector controller configured to control the deflector 1-2 is applied. However, a separate dedicated electronic control unit (ECU) for the hidden air curtain 10 can be applied as the controller 100 as necessary.

Referring to FIG. 2, detailed configurations of the air duct 20, the curtain box 30, and the supporter 50 are illustrated.

For example, the air duct 20 is matched with a length of a side portion of the bumper 1-1 in a curve shape curved along a curvature of the side surface portion of the bumper 1-1 or the bumper skin 1-1A, and has a cross section formed in a one-side opened structure of a "U" to form the air passage 20-1 at a predetermined height.

In particular, the air duct 20 is formed with (i.e., includes) a duct slit 21, and the duct slit 21 has the curtain box 30 fitted therein to maintain an assembled state and guides the forward/backward movements of the curtain box 30.

For example, the curtain box 30 is composed of a box body 31 fixed to the power connection member 40 and pulled and retreated by forming the tension with the power connection member 40 caused by driving the actuator 5. The curtain box 30 also includes a curtain door 33 formed integrally with the box body 31 to open the air hole 3 with the retreated movement of the box body 31 to communicate it with the outside. The curtain box 30 also includes and a duct spring 35 located between the air duct 20 and the curtain door 33 and compressed by the retreated movement of the box body 31 and then applying a spring restoring force to the curtain door 33 by the release of the tension with the power connection member 40 when the actuator 5 stops.

In particular, the box body 31 is formed in a cross-sectional structure of a "U" shape to be fitted into the duct slit 21 of the air duct 20, and therefore, the half body section is located outside the air passage 20-1 and the remaining section is located in an inner space of the air passage 20-1.

Further, the curtain door 33 is formed in a flat inclined plate shape, and an inclined angle is matched with the curvature of the bumper skin 1-1A, thereby blocking the air hole 3 perforated in the bumper skin 1-1A. In this case, the same color as the color of the bumper 1-1 or the bumper skin 1-1A is applied to the color of the externally exposed surface of the curtain door 33, such that the air hole 3 blocked by the curtain door 33 is not recognized as the hole from the outside due to the same color.

Further, a coil spring is applied as the duct spring 35, and a pair of coil springs with a large diameter that surrounds the coil spring with a small diameter are formed. In this case, the pair of coil springs with the large/small diameters have the other side fixed to the air duct 20 with one side fixed to the curtain door 33. Therefore, the box body 31 and the curtain door 33 are moved by the backward/forward movements whereas the coil springs are compressed without location movement and then can be restored to the initial state.

For example, the supporter 50 is composed of a rotary shaft 51 with a circular cross section horizontally (vertically) fixed to a shaft bracket 53 such that the power connection member 40 is latched. The shaft bracket 53 is fixed to the air duct 20 to horizontally arrange the rotary shaft 51.

In particular, the rotary shaft 51 allows the power connection member 40 that connects the curtain box 30 with the actuator 5 to be formed at the right angle.

Therefore, the rotary shaft 51 can bend the power connection member 40 in a "L" shape to move the power connection member 40 in upward/downward directions to move the curtain box 30 (i.e., the box body 31) in forward/backward directions. In this case, the downward direction of the upward/downward directions refers to a road direction, and the forward direction of the forward/backward directions refers to a direction of the air hole 3.

Figure 3:
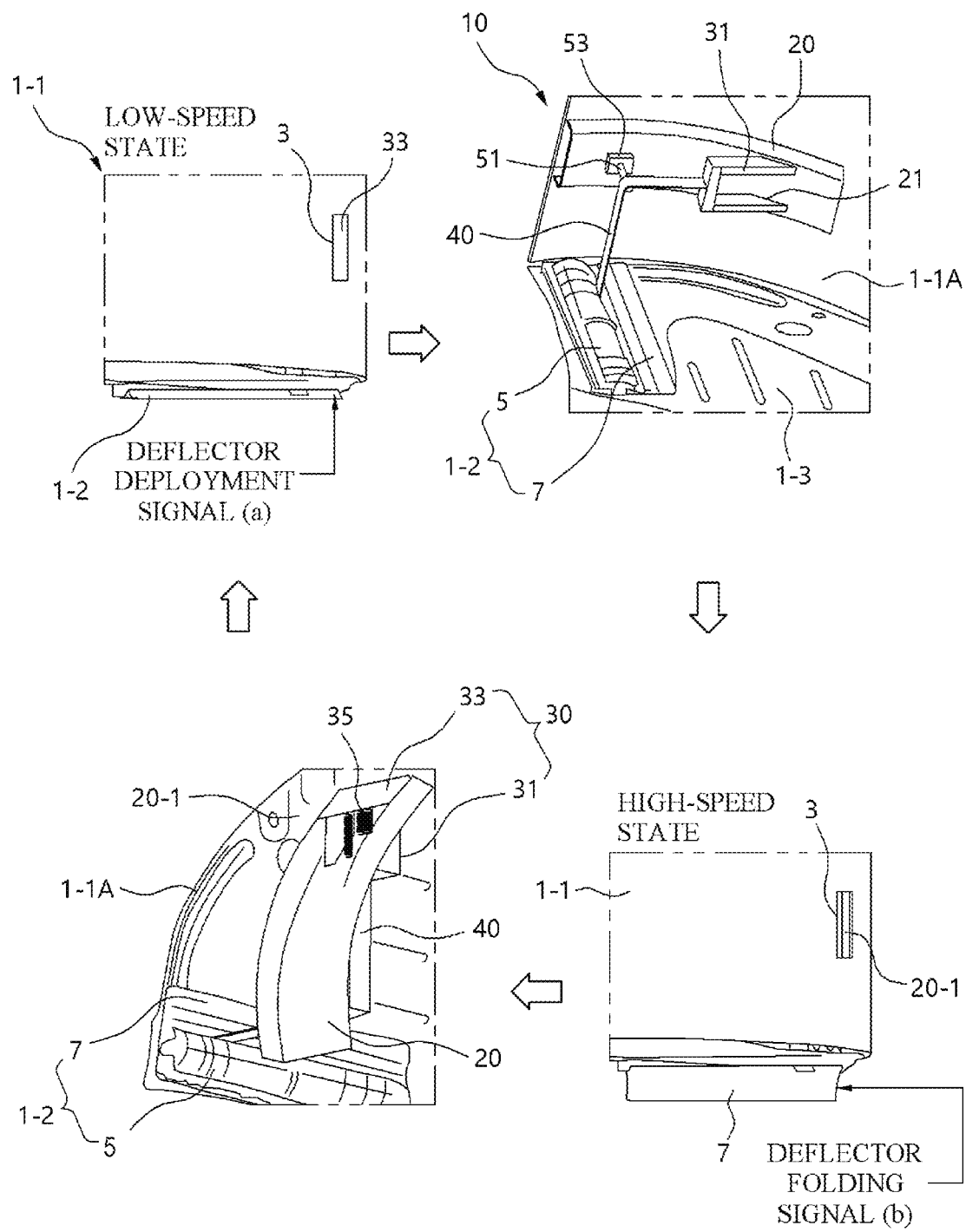
FIG. 3 is a diagram showing a state where the speed sensitive type active hidden air curtain according to the present disclosure is interlocked with the deployment of a deflector to be operated together when a vehicle is changed from a low speed traveling state to a high speed traveling state.
Figure 4:
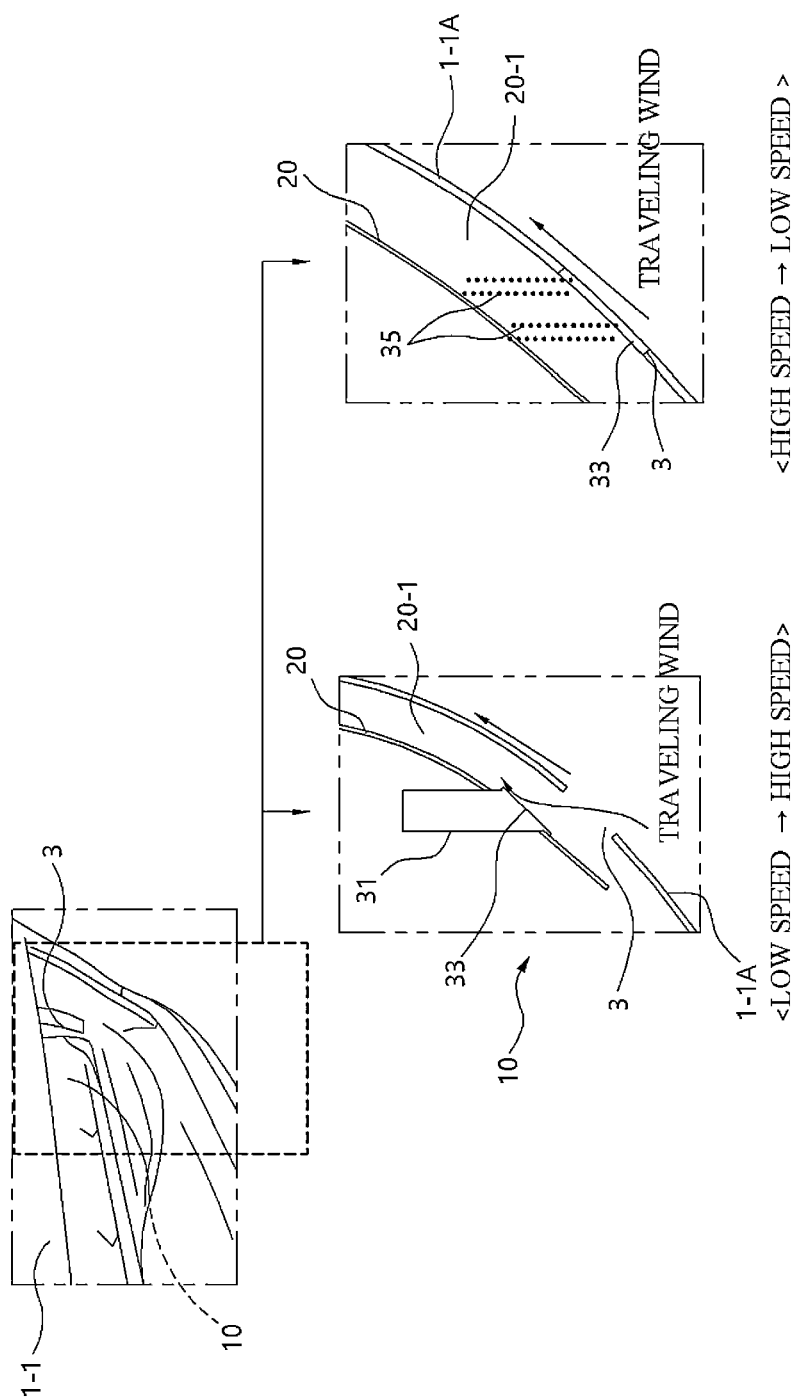
FIG. 4 is an inner cross-sectional diagram of a bumper showing an operation state of the speed sensitive type active hidden air curtain according to the present disclosure.

FIGS. 3 and 4 show operation states where the hidden air curtain 10 is interlocked with the deflector 1-2 depending upon the traveling speed of the vehicle 1.

For example, referring to an operation of the hidden air curtain 10 switched "from a high-speed state into a low-speed state" of FIG. 3, the color of the externally exposed surface of the curtain door 33 is the same color as the color of the externally exposed surface of the bumper 1-1 or the bumper skin 1-1A, and therefore, the air hole 3 becomes a state of being not recognized as a hole from the outside.

As a result, referring to the switched state of the "high speed→low speed" of FIG. 4, the controller 100 does not drive the deflector 1-2 in the low-speed traveling state of the vehicle 1 and therefore, the hidden air curtain 10 is in the non-operation state. Therefore, the curtain box 30 of the bumper interlocking device 10-1 is located in the air hole 3 of the bumper 1-1.

Therefore, since the duct spring 35 is in the tensioned initial state, the curtain box 30 is in a state of being pushed toward the bumper skin 1-1A (i.e., forward state), and therefore, the air hole 3 is blocked by the curtain door 33 of the curtain box 30. Therefore, the traveling wind does not flow into the air passage 20-1 of the air duct 20 and forms the external flow going through the outside surface of the bumper skin 1-1A.

For example, referring to the operation of the hidden air curtain 10 switched "from the low-speed state into the high-speed state" of FIG. 3, when the controller 100 confirms the increase in the vehicle speed or the input of the button signal to output the deflector deployment signal (a), the deflector 1-2 is driven and therefore, the hidden air curtain 10 is also switched into the operation state in conjunction therewith.

Then, the actuator 5 of the deflector 1-2 is driven and therefore, the flap 7 moves downward from the undercover 1-3 (or vehicle body panel) to the bottom of the vehicle body, and in this process, the power connection member 40 latched to the rotary shaft 51 of the supporter 50 is pulled downward by the rotary shaft of the actuator 5. In this case, the power connection member 40 is wound around the winding mechanism provided on the rotary shaft of the actuator 5 to pull the curtain box 30 by the wound amount.

Subsequently, the curtain box 30 is retreated and therefore, the box body 31 exits from the duct slit 21 of the air duct 20, and at the same time, the curtain door 33 moves toward the air passage 20-1 of the air duct 20 to be separated from the bumper 1-1 or the bumper skin 1-1A, thereby opening the air hole 3. In this case, the duct spring 35 is fixed to the air duct 20 and therefore, switched into the compressed state by the retreated movement of the curtain door 33.

As a result, referring to the switching state of "the low speed→the high speed" of FIG. 4, the air hole 3 is opened and therefore, most of the traveling wind flowing through the outside surface of the bumper 1-1 or the bumper skin 1-1A enters the air hole 3 to flow through the air passage 20-1 of the air duct 20.

Therefore, the air passage 20-1 sends the introduced air toward the wheel behind the bumper 1-1, and the air coming from the air passage 20-1 smooths the airflow to reduce the air resistance applied to the wheel.

Figure 5:
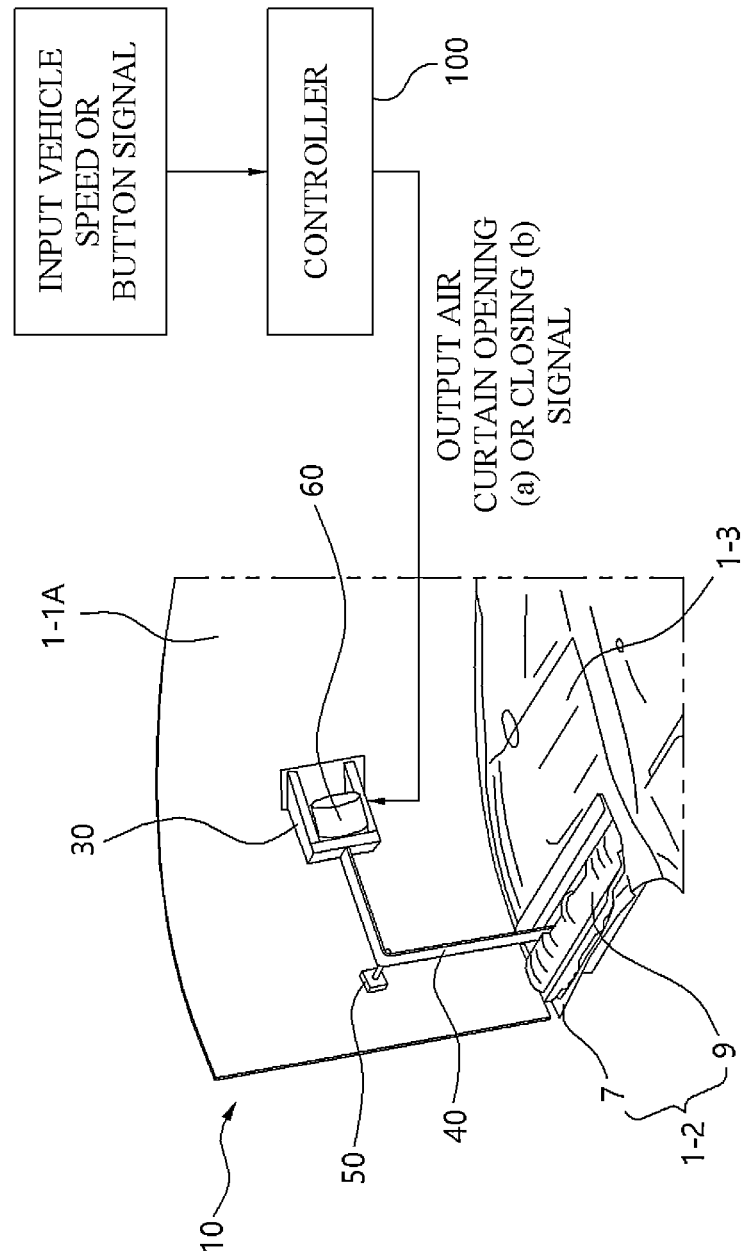
FIG. 5 is a diagram showing a configuration in which the speed sensitive type active hidden air curtain according to the present disclosure is operated as a driving source to interlock the deflector.
Figure 6:
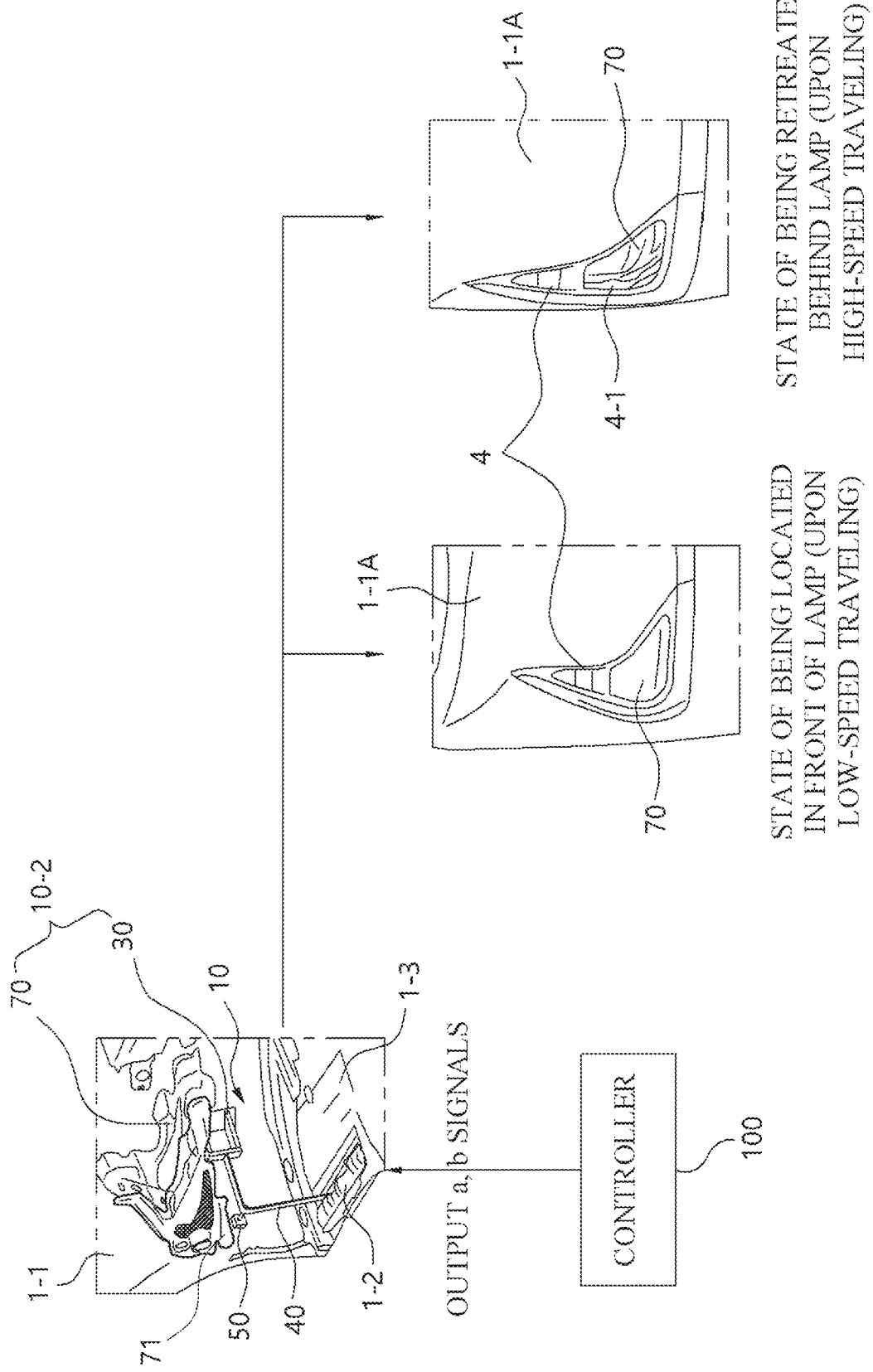
FIG. 6 is a diagram showing an example of a configuration in which the speed sensitive type active hidden air curtain according to the present disclosure is connected to a lamp of the bumper.

FIGS. 5 to 7 show various modifications of the speed sensitive type hidden air curtain 10.

Referring to FIG. 5, the speed sensitive type active hidden air curtain 10 has a configuration that is provided with an air curtain driving machine 60 and operated in a direct control of the controller 100. In this case, the air curtain driving machine 60 pushes the box body 31 of the curtain box 30 when driven by the controller 100 to open and pull the air hole 3 to block the air hole 3, and at the same time, operates an interlocking mechanism 9 of the deflector 1-2 by the movement of the power connection member 40 upon opening and blocking operation of the air hole 3 to move the flap 7 upward or downward.

Therefore, the speed sensitive type active hidden air curtain 10 equally applies the bumper interlocking devices 10-1 shown in FIGS. 1 to 4, but there is a difference in that the actuator 5 of the deflector 1-2 is not applied as the driving source because the air curtain driving machine 60 is applied. In this case, the duct spring 35 cannot be applied to the curtain box 30.

Therefore, the deflector 1-2 is composed of the flap 7 and the interlocking mechanism 9. The interlocking mechanism 9 receives power from the air curtain driving machine 60, and the controller 100 uses the vehicle speed or the button signal as the input signal but outputs an air curtain opening signal (a) or closing signal (b) to the air curtain driving machine 60. Therefore, the deflectors 1-2 shown in FIGS. 1 to 4 are configured differently from a case where the actuator 5 is applied.

As described above, the air curtain driving machine 60 type speed sensitive type active hidden air curtain 10 uses the separate air curtain driving machine 60 instead of the actuator 5 of the deflector 1-2 as the driving source. Therefore, it is possible to provide universality or expandability connected to various devices or systems, such as a speed sensitive type variable wheel deflector using wind power, a speed sensitive type variable wheel deflector using hydraulic pressure, an upper/lower containment type variable wheel deflector using a motor, and an upper/lower containment type active air skirt/active air dam/active air lip using the motor in the road clearance variable type device such as the deflector 1-2.

Referring to FIG. 6, the speed sensitive type active hidden air curtain 10 is composed of the lamp interlocking device 10-2 connected to a lamp 70 and therefore, can perform the operation of simultaneously satisfying the lamp function and the air curtain performance of the vehicle 1 through a lamp hole 4-1 of a lamp entry 4 covering the front surface of the lamp 70 located on the bumper 1-1.

As described above, as shown in FIGS. 1 to 4, the lamp interlocking device 10-2 type speed sensitive type hidden air curtain 10 applies the actuator 5 of the deflector 1-2 as the driving source but there is a difference in that only the curtain box 30 is applied without using the air duct 20 unlike the bumper interlocking device 10-1.

In particular, the curtain box 30 applied to the lamp interlocking device 10-2 is composed of the box body 31 connected to the power connection member 40 and therefore, does not use the duct spring 35. The box body 31 has one end directly fixed to a lamp housing 71 of the lamp 70 or fixed to the lamp housing 71 of the lamp 70 by providing the curtain door 33, thereby moving the lamp 70 forward/backward.

Therefore, since the deflector 1-2 and the lamp interlocking device 10-2 are not operated by the deflector closing signal (b) of the controller 100 upon low-speed traveling of the vehicle 1, the lamp 70 closely contacts the lamp entry 4 of the bumper 1-1 to block the lamp hole 4-1 and therefore, the traveling wind does not flow into the lamp hole 4-1.

On the other hand, the deflector 1-2 and the lamp interlocking device 10-2 are operated by the deflector deployment signal (a) upon high-speed traveling of the vehicle 1 and therefore, the lamp 70 is separated from the lamp entry 4 by the curtain box 30 pulled by the power connection member 40 to open the lamp hole 4-1.

Therefore, when the lamp hole 4-1 is opened in the high-speed traveling state of the vehicle 1, the traveling wind flows into the inner space of the bumper 1-1 through the lamp hole 4-1, thereby improving the aerodynamic reduction caused by the lamp entry 4 blocking the traveling wind.

Referring to FIG. 7, the speed sensitive type active hidden air curtain 10 has a configuration that is switched into the hole color change device 10-3 and therefore, can inform the outside of the traveling state of the vehicle 1 through the air hole 3 of the bumper 1-1.

To this end, the hole color change device 10-3 type speed sensitive type hidden air curtain 10 is provided with a different color door 80, and the different color door 80 uses the actuator 5 of the deflector 1-2 as the driving source and is connected to the power connection member 40. Therefore, there is a difference in that the air duct 20 and the curtain box 30 are not applied unlike the bumper interlocking devices 10-1 shown in FIGS. 1 to 4.

In particular, the different color door 80 fixes a door rotary shaft 90, and forms one side of both left and right surfaces of the different color door 80 as a first color door inside surface 80A and the other side thereof as a second color door outside surface 80B, thereby varying colors. In this case, different images instead of different colors can be applied to the first and second color door inside/outside surfaces 80A, 80B.

For example, colors different from the color of the bumper 1-1 are applied to the first and second color door inside/outside surfaces 80A, 80B, in which a dark color or a low-speed state image is applied to the first color door inside surface 80A whereas an intense color or a high-speed state image is applied to the second color door outside surface 80B, thereby varying the outside recognition level. In this case, as the dark color, gray series can be applied, and as the intense color, red series can be applied.

Therefore, since the deflector 1-2 and the hole color change device 10-3 are not operated by the deflector closing signal (b) of the controller 100 upon low-speed traveling of the vehicle 1, the air hole 3 of the bumper 1-1 is covered by the first color door inside surface 80A of the different color door 80, and the color of the first color door inside surface 80A is exposed to the outside through the air hole 3, thereby externally recognizing that the vehicle 1 is in the low-speed traveling state.

On the other hand, the deflector 1-2 and the hole color change device 10-3 are operated by the deflector deployment signal (a) upon high-speed traveling of the vehicle 1, the door rotary shaft 90 is rotated by the pulling of the power connection member 40, and the rotation of the door rotary shaft 90 reverses the locations of the first color door inside surface 80A and the second color door outside surface 80B and therefore, the second color door outside surface 80B covers the air hole 3 of the bumper 1-1.

Therefore, the color of the second color door outside surface 80B covering the air hole 3 of the bumper 1-1 in the high-speed traveling of the vehicle 1 is exposed to the outside through the air hole 3, thereby externally recognizing that the vehicle 1 is in the high-speed traveling state.

As described above, the hole color change device 10-3 type speed sensitive type hidden air curtain 10 can variably produce the image of the side surface portion of the bumper 1-1 with different colors of the different color door 80 together with the operation of the deflector 1-2.

As described above, the speed sensitive type active hidden air curtain 10 applied to the vehicle 1 according to the present embodiment can be composed of the hole opening or closing devices 10-1, 10-2, 10-3 that cover or open the air hole 3 of the bumper 1-1 facing the traveling wind by any one of the bumper interlocking device 10-1, the lamp interlocking device 10-2, and the hole color change device 10-3 to guide the air to the space formed between the bumper 1-1 and the wheel. The power connection member 40 is capable of moving the hole opening or closing devices 10-1, 10-2, 10-3 in conjunction with the deflector 1-2 that guides the traveling wind under the bumper 1-1, and the supporter 50 is capable of maintaining the tension of the power connection member 40, thereby implementing the clean and differentiated design image of the bumper 1-1 and improving the appearance quality thereof by covering the air hole 3 exposed to the outside as well as improving the performance of the vehicle drag under a control of the deflector 1-2 or the hole opening or closing devices 10-1, 10-2, 10-2 by the controller 100.

What is claimed is:

1. A hidden air curtain comprising:
   a hole opening or closing device configured to cover or open an air hole of a bumper facing traveling wind such that air is guided to a side portion of a tire in a space between the bumper and a wheel; and
   a power connection member interlocked with the movement of the hole opening or closing device, and connected to a vehicle aerodynamic improvement device to which the traveling wind is guided,
   wherein the hole opening or closing device is any one of a bumper interlocking device, a lamp interlocking device, or a hole color change device,
   wherein the bumper interlocking device is composed of:
      an air duct located inside the bumper, and formed with an air passage extending from the air hole toward the wheel along the bumper;
      a curtain box movable from the air duct by a pulling of the power connection member, such that the air hole opens by the movement of the curtain box; and
      the vehicle aerodynamic improvement device for the pulling of the power connection member,
   wherein the curtain box is fitted into a duct slit of the air duct, and
   wherein the curtain box maintains an assembled state by the duct slit and the movement thereof is guided by the duct slit.

2. The hidden air curtain of claim 1,
   wherein the air duct is fixed to the bumper.

3. The hidden air curtain of claim 1,
   wherein the curtain box is provided with a curtain door in which the air hole is covered, and
   wherein an externally exposed surface of the curtain door has the same color as a color of an externally exposed surface of the bumper.

4. The hidden air curtain of claim 1,
   wherein the curtain box is provided with a duct spring compressed by the movement of the curtain box, and
   wherein the duct spring generates a spring reaction force such that the curtain box covers the air hole when the pulling of the power connection member is released.

5. The hidden air curtain of claim 2,
   wherein the duct spring is located between the air duct and the curtain box, and
   wherein one end of the duct spring is constrained to the air duct such that compression occurs.

6. The hidden air curtain of claim 1,
   wherein the bumper interlocking device further comprises:
      an air curtain driving machine for the moving of the curtain box, and for moving the power connection member.

7. The hidden air curtain of claim 6,
   wherein the air curtain driving machine operates the vehicle aerodynamic improvement device by the movement of the power connection member.

8. The hidden air curtain of claim 1,
   wherein the lamp interlocking device is composed of:
      a curtain box connected to a lamp provided on the bumper, and moving the lamp by a movement caused by a pulling of the power connection member;
      a lamp entry provided on the bumper, and having a lamp hole exposing a part of the lamp to the outside perforated therein; and
      the vehicle aerodynamic improvement device for the pulling of the power connection member.

9. The hidden air curtain of claim 8,
   wherein the curtain box is fixed to a lamp housing of the lamp.

10. The hidden air curtain of claim 1,
    wherein the hole color change device is composed of:
       a different color door covering the air hole, and rotated by a pulling of the power connection member to vary an externally exposed color of the air hole; and
       the vehicle aerodynamic improvement device for the pulling of the power connection member.

11. The hidden air curtain of claim 10,
    wherein the different color door is connected to the power connection member with a door rotary shaft provided on the different color door, and
    wherein the different color door is painted in different colors or formed in different images.

12. The hidden air curtain of claim 1,
    wherein the hole opening or closing device is provided with a supporter, and the supporter maintains a tension of the power connection member.

13. The hidden air curtain of claim 12,
    wherein the supporter is provided with a rotary shaft to which the power connection member is latched, and
    wherein the rotary shaft moves the power connection member to which the hole opening or closing device and the vehicle aerodynamic improvement device are connected in contact with the rotary shaft.

14. A vehicle comprising:
    a bumper;
    a deflector deployed under the bumper at a vehicle speed, and guiding traveling wind;
    a hidden air curtain facing the traveling wind on a side portion of the bumper, and interlocked with any one of a bumper interlocking device, a lamp interlocking device, and a hole color change device by a movement of a power connection member connected to the deflector in a state where tension is maintained by a supporter; and
    a controller configured to operate the deflector or the hidden air curtain depending upon a change in the vehicle speed.

15. The vehicle of claim 14,
    wherein the bumper interlocking device is configured to allow power generated by an actuator of the deflector to be delivered to the power connection member to open or close an air hole perforated in the bumper, or
    to allow power generated by an air curtain driving machine of the hidden air curtain to be delivered from the power connection member to the deflector while opening or closing the air hole.

16. The vehicle of claim 14,
    wherein the lamp interlocking device is configured to allow power generated by an actuator of the deflector to be delivered to the power connection member to open or close a lamp hole of a lamp entry provided on the bumper.

17. The vehicle of claim 14, wherein the hole color change device is configured to allow power generated by an actuator of the deflector to be delivered to the power connection member to cover an air hole perforated in the bumper in different colors.

18. A hidden air curtain comprising:
a hole opening or closing device configured to cover or open an air hole of a bumper facing traveling wind such that air is guided to a side portion of a tire in a space between the bumper and a wheel; and
a power connection member interlocked with the movement of the hole opening or closing device, and connected to a vehicle aerodynamic improvement device to which the traveling wind is guided,
wherein the hole opening or closing device is any one of a bumper interlocking device, a lamp interlocking device, or a hole color change device, and
wherein the bumper interlocking device is composed of:
an air duct located inside the bumper, and formed with an air passage extending from the air hole toward the wheel along the bumper;
a curtain box movable from the air duct by a pulling of the power connection member, such that the air hole opens by the movement of the curtain box; and
an air curtain driving machine for the moving of the curtain box, and for moving the power connection member.

* * * * *